United States Patent [19]

Iyoda et al.

[11] Patent Number: 5,609,358
[45] Date of Patent: Mar. 11, 1997

[54] ACTIVATION CONTROL SYSTEM FOR VEHICULAR AIR BAGS

[75] Inventors: Motomi Iyoda, Seto; Yoshikazu Ohno, Okazaki; Koichi Fujita, Nagoya; Naoki Ishii, Handa; Toshiaki Matsuhashi, Gamagori; Yukihito Okada, Anjo, all of Japan

[73] Assignees: Toyota Jidosha Kabushiki Kaisha, Toyota; Nippon Soken Inc., Nishio, both of Japan

[21] Appl. No.: 560,591

[22] Filed: Nov. 20, 1995

Related U.S. Application Data

[63] Continuation of Ser. No. 101,077, Aug. 3, 1993, abandoned.

[30] Foreign Application Priority Data

| Aug. 4, 1992 | [JP] | Japan | 4-227905 |
| Aug. 10, 1992 | [JP] | Japan | 4-234168 |

[51] Int. Cl.⁶ ................................................. B60R 21/32
[52] U.S. Cl. .................. 280/735; 180/274; 180/282; 364/424.055
[58] Field of Search ............... 280/735; 180/274, 180/282; 364/424.05

[56] References Cited

U.S. PATENT DOCUMENTS

| 4,842,301 | 6/1989 | Feldmaier | 180/274 |
| 4,975,850 | 12/1990 | Diller | 180/274 |
| 5,172,790 | 12/1992 | Ishikawa et al. | 180/268 |
| 5,202,831 | 4/1993 | Blackburn et al. | 280/735 |
| 5,234,228 | 8/1993 | Morota et al. | 280/735 |
| 5,363,302 | 11/1994 | Allen et al. | 280/735 |

FOREIGN PATENT DOCUMENTS

| 0528514 | 5/1992 | European Pat. Off. |
| 3-276844 | 12/1991 | Japan |
| 3-276843 | 12/1991 | Japan |
| 90/03289 | 4/1990 | WIPO |

*Primary Examiner*—Eric D. Culbreth
*Attorney, Agent, or Firm*—Cushman, Darby & Cushman IP Group of Pillsbury Madison & Sutro LLP

[57] ABSTRACT

An activation control system for controlling activation of a plurality of air bag systems for protecting a passenger by expanding an air bag between the passenger and a vehicular body when the vehicle makes a collision. A collision detector outputs a signal according to the direction and magnitude of the collision. A collisional direction detector detects the direction of the collision on the basis of the signal outputted from said collision detection. An ignition signal output unit outputs an ignition signal to the air bag system which is determined on the basis of the collisional direction detected.

4 Claims, 16 Drawing Sheets

- - - - - INTEGRATED VALUE AT SHORT TIME INTERVALS

——— INTEGRATED VALUE AT LONG TIME INTERVALS

FIG.22

| No | OPERATED VALUE | COLLISIONAL STRENGTH | COLLISIONAL DIRECTION | REMARKS |
|---|---|---|---|---|
| 1 | $G_x$, $G_y$ | $\sqrt{G_x^2 + G_y^2}$ | $\tan^{-1} \dfrac{G_x}{G_y}$ | |
| 2 | $V_x$, $V_y$ | $\sqrt{V_x^2 + V_y^2}$ | $\tan^{-1} \dfrac{V_x}{V_y}$ | $V = \int G \, dt$ |
| 3 | $S_x$, $S_y$ | $\sqrt{S_x^2 + S_y^2}$ | $\tan^{-1} \dfrac{S_x}{S_y}$ | $V = \int \int G \, dt$ |
| ⋮ | ⋮ | ⋮ | ⋮ | ⋮ |
| n | $f_x$, $f_y$ | $\sqrt{f_x^2 + f_y^2}$ | $\tan^{-1} \dfrac{f_y}{f_x}$ | $f = f(G)$ |

HERE
- $\theta_F$: THRESHOLD VALUE OF FRONTAL COLLISION
- $\theta_S$: THRESHOLD VALUE OF LATERAL COLLISION

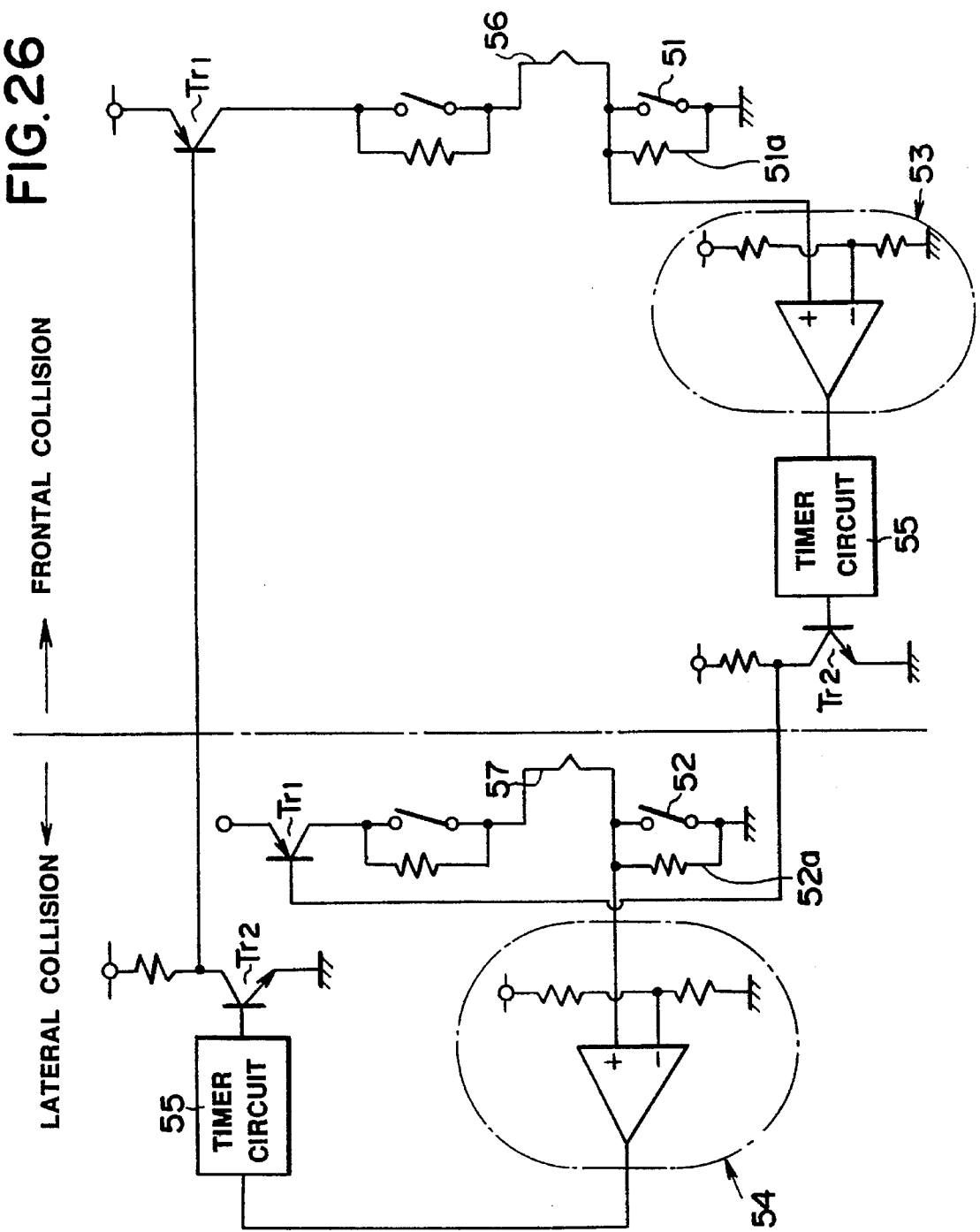

ACTIVATION CONTROL SYSTEM FOR VEHICULAR AIR BAGS

This is a continuation of application No. 8/101,077, filed on Aug. 3, 1993 abandoned.

BACKGROUND OF THE INVENTION

The present invention relates to an air bag system for expanding an air bag for protecting a passenger of a vehicle when a collision of the vehicle is detected and, more particularly, to a vehicular air bag activation control system for activating an air bag in the position which is determined on the basis of a collisional direction.

The air bag system of this kind detects a collision on the basis of the ON action of a switch accompanying either an acceleration (including a deceleration as in the following) or a crush of the vehicular body, and ignites an inflator in response to the detection signal to produce gases so that the air bag may be expanded with the gases between the passenger and the inner wall of the vehicular body. In the prior art, an ordinary vehicle is frequently equipped with the air bag system for protecting the driver. In recent years, however, there has been developed the technology of mounting the air bag system additionally in front of the passenger's seat or in the side door.

On the other hand, the collisional accident of a vehicle has various modes, in which the collision will not always be limited to accurately longitudinal or lateral directions, for example, but may be directed obliquely or followed by a turn of the vehicular body. Moreover, the load or acceleration to be exerted by the collision may be so diversified as to act in the opposite direction to the collisional direction due to a vibratory return after the collision.

Therefore, in the vehicle equipped either with the air bag systems for front and lateral collisions or with air bags for lateral collisions at righthand and lefthand doors, as described above, the active air bag system, i.e., the air bag system to be activated has to be determined in accordance with the collision mode so as to protect the passenger properly from a secondary collision resulting from the primary collision. In the prior art, however, no system has been known for activating a plurality of air bag systems selectively in accordance with the mode of a collision, although there have been developed either the sensor having a high sensitivity, the system for detecting a collision reliably or the system for preventing any malfunction.

SUMMARY OF THE INVENTION

A main object of the present invention is to provide a control system capable of selecting and activating such one of a plurality of air bag systems properly as is necessary for protecting a passenger of a vehicle.

Another object of the present invention is to provide a control system capable of preventing the unnecessary one of the air bags from being expanded.

Still another object of the present invention is to provide a control system capable of activating an air bag system properly even for the collision which will occur with a time delay.

According to the present invention, therefore, there is provided an air bag control system for a vehicle equipped with either air bag systems for front and lateral collisions or air bag systems for righthand and lefthand collisions. The air bag control system comprises: collision detect means such as an acceleration sensor for detecting collisions in at least two directions; and collisional direction detect means for detecting the directions of the collisions on the basis of an output signal from the collision detect means. The air bag system to be activated is determined by active air bag determine means on the basis of the detection result of the collision detect means, and the air bag system determined is fed with an ignition signal and activated in response to either the output signal of the determination or the output signal of the detection of the collisional direction.

The air bag systems other than that thus activated are inhibited from any activation by ignition inhibit means. Thus, it is possible to prevent any unnecessary air bag from being activated by the vibration such as the so-called "vibratory return" after the collision.

This inhibition of activation is continued for a predetermined time period if constant time ignition inhibit means is provided. In this case, moreover, the air bag system having its activation inhibited temporarily can be activated for the collision, which will secondarily occur with a time delay, to protect the passenger from the secondary collision.

The above and further objects and novel features of the present invention will more fully appear from the following detailed description when the same is read in connection with the accompanying drawings. It is to be expressly understood, however, that the drawings are for purpose of illustration only and are not intended as a definition of the limits of the invention.

BRIEF DESCRIPTION OF THE DRAWINGS

FIG. 16 is a flow chart showing one example of a control routine for the inhibition controls based on the order in which the sensor is turned ON;

FIG. 22 is an explanatory diagram exemplifying the kinds of operated values to be used for comparing decisions;

FIG. 26 is a circuit diagram schematically showing a circuit for the inhibition controls of the air bag modules for frontal and righthand/lefthand collisions.

DETAILED DESCRIPTION OF THE PREFERRED EMBODIMENTS

Figure 1:
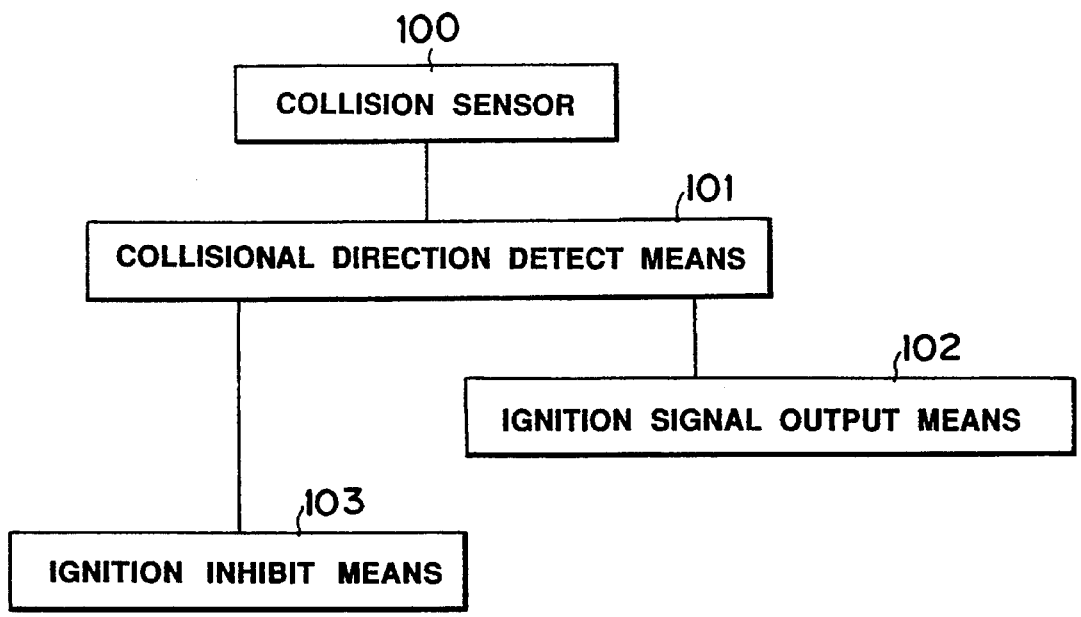
FIG. 1 is a block diagram showing one embodiment of the present invention schematically by functional means.

FIG. 1 is a block diagram showing one embodiment of the present invention by functional means. A collision sensor 100 is connected with collisional direction detect means 101. The collision sensor 100 is composed of either a contact switch to be crushed to have its contacts closed or a non-contact switch for outputting a signal according to a load. The collision sensor 100 thus composed outputs a signal according to the input direction of a collisional load. The collisional direction detect means 101 detects the collisional direction on the basis of the signal inputted from the collision sensor 100 and outputs a signal indicating the detected direction to ignition signal output means 102. This ignition output means 102 outputs an ignition signal to the air bag system which is positioned to correspond to the collisional direction detected by the collisional direction detect means 101. There is further provided ignition inhibit means 103 for inhibiting the ignitions of the air bag systems other than that which was ignited. This ignition inhibition is continued only for the time period which is predetermined, if necessary.

Figure 2:
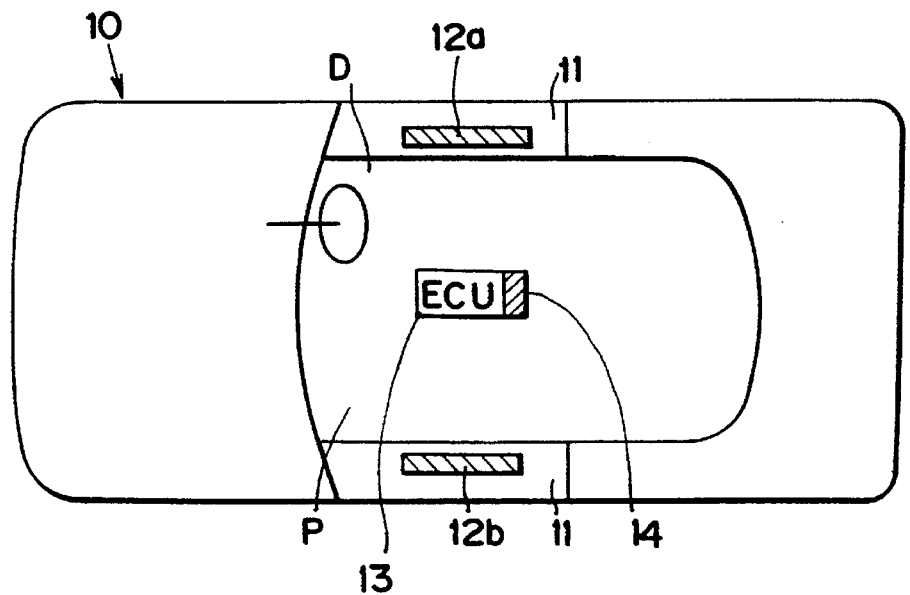
FIG. 2 is a diagram showing the arrangement of side air bag modules and a control system.
Figure 3:
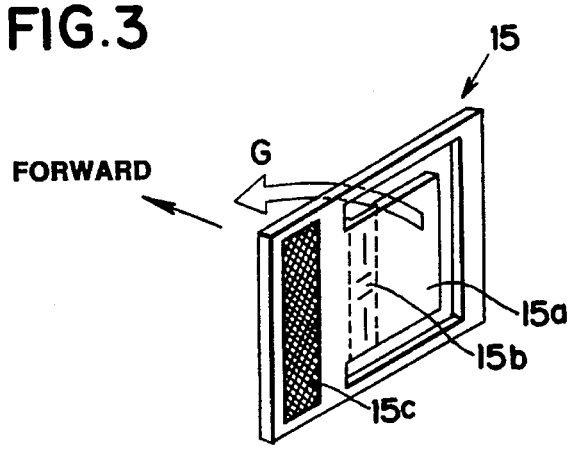
FIG. 3 is a perspective view showing one example of a semiconductor type acceleration sensor.

Here will be described a more specific example. As shown in FIG. 2, a vehicle 10 is equipped with side doors 11 at the individual sides of the driver's seat D and the passenger's seat P. In the compartment sides of these side doors 11, there are disposed side air bag modules 12a and 12b which are supported by the (not-shown) door inner panels while confining folded air bags and inflators. Below the center console positioned at the central portion of the vehicular body, on the other hand, there are disposed an air bag activation control unit 13 for controlling the activations of individual air bags and an acceleration sensor 14 for detecting a collision. This acceleration sensor 14 is exemplified by a semiconductor type acceleration sensor 15, as shown in FIG. 3. This acceleration sensor 15 is composed of a planar cantilever portion 15a made of a metal, a gauge portion 15b formed at the root of the cantilever portion 15a, and an integrated circuit portion 15c for extracting as a signal the resistance change which is made by the deformation of the gauge portion 15b when the leading end of the cantilever portion 15a rocks as a weight. The acceleration sensor 15 thus composed can be used as one for a frontal collision, if so attached to the vehicular body that the cantilever portion 15a may rock longitudinally of the vehicular body. Then, the forward of the vehicular body can be expressed in terms of positive (+) values, and the backward can be expressed in terms of negative (−) values. On the other hand, if the acceleration sensor 15 is so attached to the vehicular body that the cantilever portion 15a may rock laterally of the body, it can be used as one for lateral collisions. In this case, the rightward of the vehicular body, as taken in the forward run, can be expressed in terms of positive (+) values, and the leftward can be expressed in terms of negative (−) values.

Figure 4:
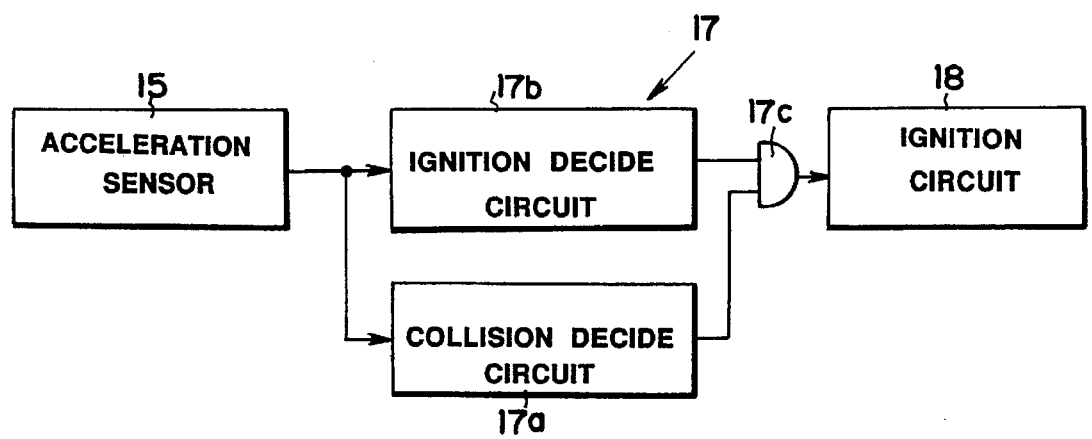
FIG. 4 is a block diagram showing a control system in principle.
Figure 5:
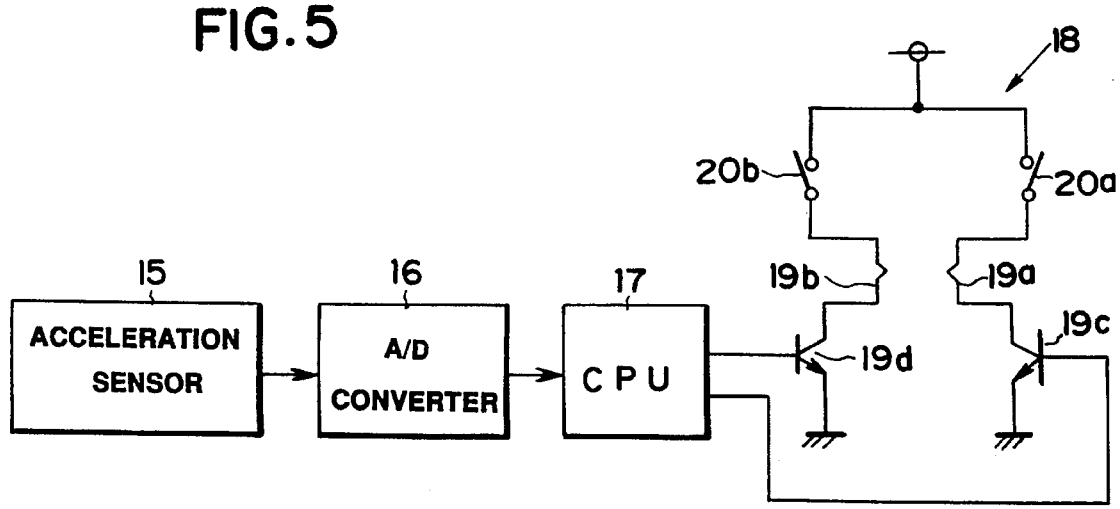
FIG. 5 is a circuit diagram showing one example of an ignition circuit specifically.

Moreover, a lateral collision air bag control unit 17 for controlling the activations of lateral collision air bags to be expanded at the time of lateral collisions can be constructed to have a circuit, as shown in a block diagram in FIG. 4. In this control unit 17, the semiconductor type acceleration sensor 15 is used as one for the lateral collisions so that a collision decide circuit 17a and an ignition decide circuit 17b are activated when the acceleration sensor 15 detects a collisional load from the side of the vehicular body. The collision decide circuit 17a decides the air bag module 12a or 12b to be activated, and the ignition decide circuit 17b decides the magnitude of the collision. These circuits 17a and 17b are connected through an AND gate 17c with an ignition circuit 18. As a result, the collision decide circuit 17a and the ignition decide circuit 17b output their signals so that the ignition circuit 18 outputs its signal to the predetermined side air bag module 12a or 12b. In FIG. 5, there is shown an example in which such decisions are executed by a microcomputer. When the acceleration sensor 15 detects a collisional load from one side of the vehicular body, as shown in FIG. 5, its signal is converted into a digital signal by an A/D converter 16 and is inputted to the lateral collision air bag control unit 17 composed mainly of a CPU (i.e., Central Processing Unit). Then, it is decided whether the value simply integrated from the detected value is positive or negative, and whether or not the detected value is higher than the level for igniting the inflator of the side air bag module 12a or 12b.

Figure 6:
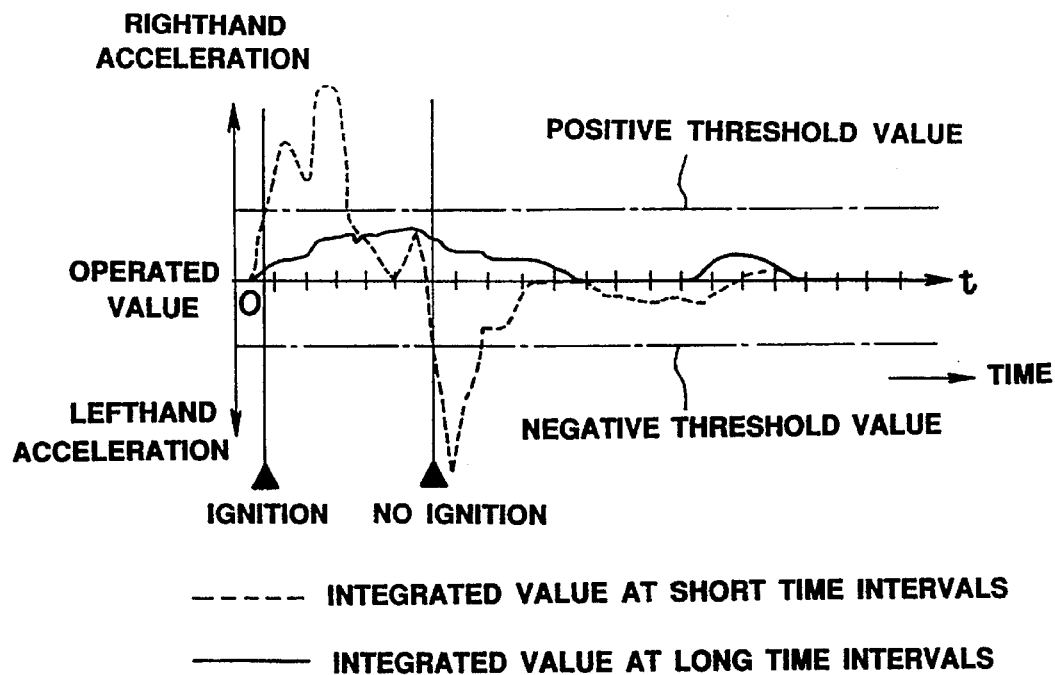
FIG. 6 is a diagram showing changes in the operated values which are obtained by integrating the output signals of an acceleration sensor.

For this decision, reference is made to FIG. 6 in which are graphically illustrated the so-called "integrated value SS at short time intervals" and "integrated value SL at long time intervals" obtained by integrating and operating the detected collisional load at short and long time intervals of orders of 1 to 100 milliseconds on the basis of their aging. As seen from FIG. 6, even if the vehicular body has a collision at its righthand side so that the collisional load is applied to the positive side and exceeds the positive threshold value until its vibratory return is established at the negative side and exceeds the negative threshold value, the second and subsequent signal exceeding that negative threshold value is not detected as any collision.

Figure 7:
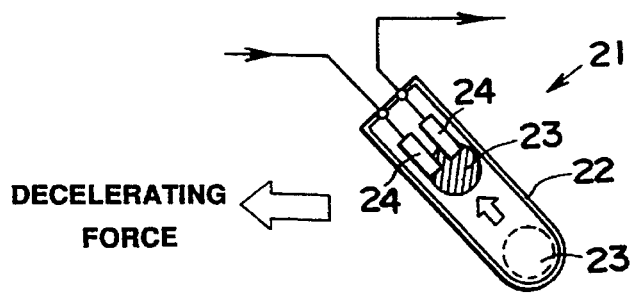
FIG. 7 is a perspective view showing a mercury type safety sensor.
Figure 8:
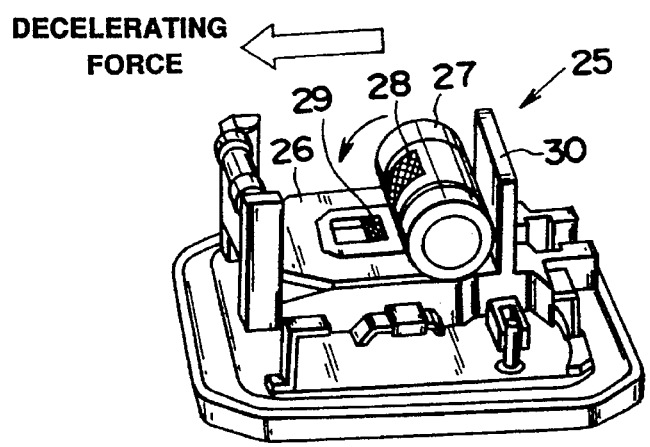
FIG. 8 is a perspective view showing a roller type safety sensor.

The side air bag module 12a or 12b to be activated is decided depending upon whether those integrated values exceed at first the positive threshold value or the negative threshold value. With reference to FIG. 5, from the air bag control unit 17 for lateral collisions, there is outputted either an ignition signal for turning ON a transistor 19c connected in series with a squib 19a of the ignition circuit 18 for the righthand air bag or an ignition signal for turning ON a transistor 19d connected in series with a squib 19b for the lefthand air bag. Incidentally, reference numerals 20a and 20b appearing in the ignition circuit of FIG. 5 designate individual safety sensors for preventing the malfunctions of the air bags at the time of no collision. The safety sensors 20a and 20b are exemplified by a mercury type safety sensor 21, as shown in FIG. 7, or a roller type safety sensor 25, as shown in FIG. 8.

The former safety sensor 21 is manufactured by filling a predetermined amount of mercury 23 in a container 22 having a shape of test tube and by arranging positive and negative electrodes 24 and 24 at a spacing in the upper portion of the container 22. The safety sensor 21 thus manufactured is positioned at an inclination with respect to the direction (leftward or rightward of the vehicular body), in which is applied a collisional load. Thus, the mercury 23 normally standing on the bottom of the container 22 is raised, if it receives a load at a predetermined or higher level at the time of a lateral collision, to establish the conduction between the two electrodes 24 and 24. On the other hand, during no collision or while the load, if any, is low, the mercury 23 in the container 22 is kept away from contact with the electrodes 24. As a result, the safety sensor 21 is not turned ON so that neither of the squibs 19a and 19b are ignited to prevent any unnecessary expansion of the air bags. The air bag at the non-collision side is not ignited so that it may be effectively used for a subsequent lateral collision, if any.

On the other hand, the latter safety sensor 25 is composed of: a roller 27 having its circumference wound by one end of a plate spring 26; a rotary contact 28 formed on the surface of that roller 27; and a stationary contact 29 protruded from an opening formed in the other unwound end of the aforementioned plate spring 26. When in an inoperative state, the roller 27 is biased to abut against a stopper 30 by the initial set load of the plate spring 26, so that the stationary contact 29 and the rotary contact 28 are disconnected from each other. When a collisional load is applied, the roller 27 is turned to bring its rotary contact 28 into contact with the stationary contact 29 so that the safety sensor 25 outputs an ON signal.

Figure 9:
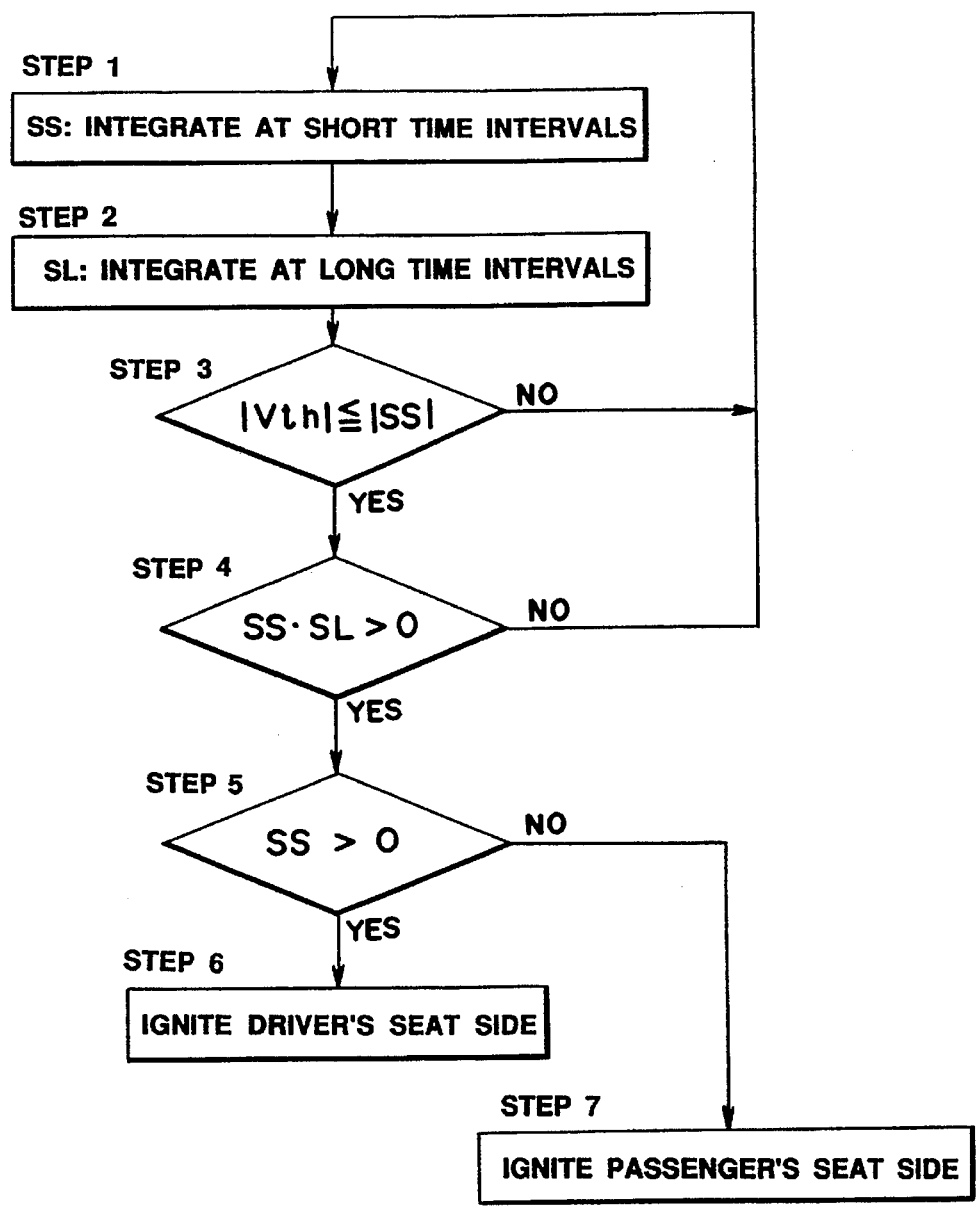
FIG. 9 is a flow chart showing a control routine for executing an ignition control of a side air bag module.

With reference to FIG. 9, here will be described the controls for igniting the aforementioned air bag modules and for inhibiting the ignitions.

A lateral collision, in which the vehicular body 10 has its side door 11 hit by another vehicle, is detected in terms of the rocking motion of the cantilever portion 15a of the side collision acceleration sensor 15 arranged at the central portion of the vehicular body. This acceleration sensor 15 outputs the signal according to the magnitude and direction of the collisional load, and this signal is converted into the digital signal by the A/D converter 16 and is inputted to the lateral collision air bag control unit 17.

In this lateral collision air bag control unit 17, it is decided whether the value of integrating the detected values simply takes a positive or negative value. Moreover, the integrated value SS, which is obtained by integrating the aging input data at an order of 1 millisecond, and the integrated value SL, which is obtained by integrating the same data at an order of about 100 milliseconds, are individually computed and used as the operated value.

Specifically, in the flow chart shown in FIG. 9, those so-called "integration at short time intervals" and "integration at long time intervals" are consecutively executed at Steps 1 and 2 to determine the individual integrated values SS and SL. At subsequent Step 3, it is decided whether or not the absolute value of the integrated value SS determined by the integration at short time intervals is larger than the absolute value of a predetermined threshold value Vth. If the absolute value of the integrated value SS is smaller than the absolute value of the threshold value Vth, the routine is returned to Step 1.

If the absolute value of the integrated value SS is not smaller at Step 3 than the absolute value of the threshold value Vth, the routine advances to Step 4, at which it is decided whether or not the product of the integrated value SS obtained by the integration at short time intervals and the integrated value obtained by the integration at long time intervals is positive, that is, whether both the integrated value SS and the integrated value SL are positive or negative. If those two integrated values SS and SL are separately positive and negative, the routine returns to Step 1.

Moreover, if SS. SL>0 at Step 4, the routine advances to Step 5, at which it is decided whether or not the integrated value SS obtained by the integration at short time intervals is positive. If the answer is YES, the routine advances to Step 6, at which the squib 19a of the side air bag module 12a at the driver's (righthand) side is energized and ignited. Since the safety sensor 20a is turned ON at this time by the inertial force at the time of the collision, the air bag at the driver's side is expanded. If the integrated value SS is negative at Step 5, on the other hand, the routine advances to Step 7, at which the squib 19b of the side air bag module 12b at the passenger's (lefthand) side is energized and ignited. Since the safety sensor 20b is turned ON at this time by the inertial force at the time of the collision, the air bag at the passenger's side is expanded. In the controls described above: Step 3 decides whether or not the magnitude of the collision activates the air bag; Step 4 inhibits the activation of the air bags other than that at the collision side; and Step 5 detects the collisional direction.

Figure 10:
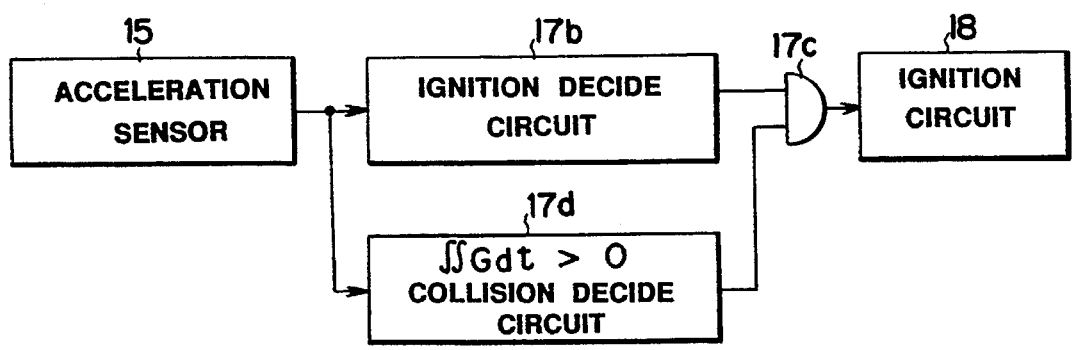
FIG. 10 is a block diagram showing another embodiment of the control system in principle.

In this embodiment, the ignition inhibiting control of the air bags is executed by deciding whether or not the value of simply integrating the detected values of the semiconductor type acceleration sensor 15 is positive. However, the collision decide circuit 17a can be replaced by a collision decide circuit 17d for integrations of second order, as shown in block diagram in FIG. 10. The integrated value of second order of a differential quantity Gdt in this case corresponds to the distance at which the passenger is moved at the time of collision. Incidentally, the simple integrated value of the differential quantity Gdt corresponds to the velocity of the collision.

The decision of the collisional direction can be executed by methods other than that based upon the aforementioned integrated value, as will be exemplified in the following.

Figure 11:
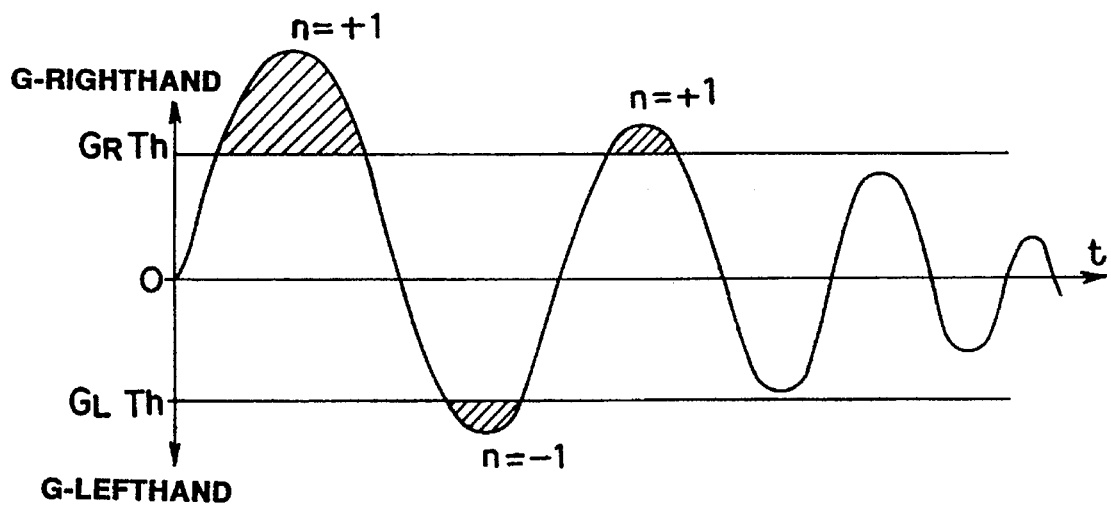
FIG. 11 is a diagram showing changes in the operated values in case the ignition inhibiting control is executed at the number of times more than a threshold value.

FIG. 11 is a graph drawn on the basis of the value which is processed through a band-pass filter from the signal outputted from the acceleration sensor 15 at the time of a lateral collision. In case the detected signal is thus processed, the reference for deciding the situations is set to a positive threshold value $G_R$th and a negative threshold value $G_L$th from the 0 (zero) value in the state having no acceleration established. Then, the number of times, at which the positive threshold value $G_R$th and the negative threshold value $G_L$th are exceeded, is determined by incrementing n=+1 in the positive case and by decrementing n=−1 in the negative case. These integrations are executed by either the control unit composed mainly of the CPU or a counter circuit.

As a result, if the integrated value Σ n is positive, the ignition of the righthand air bag is permitted whereas the ignition of the lefthand air bag is inhibited. If the integrated value Σ n is negative, the ignition of the lefthand air bag is permitted whereas the ignition of the righthand air bag is inhibited.

If Σ n=+1 as a result of such data processing, it is decided that the vehicular body has its righthand side subjected to a lateral collision, and the inflator is ignited to expand the righthand air bag but the ignition of the lefthand air bag at the non-collision side is inhibited. As a result, this lefthand air bag is not expanded so that the unnecessary air bag can be prevented from being expanded. In addition, if the lefthand side receives another lateral collision after the lateral collision at the righthand side, the lefthand air bag can be further expanded to protect the corresponding passenger, too.

Figure 12:
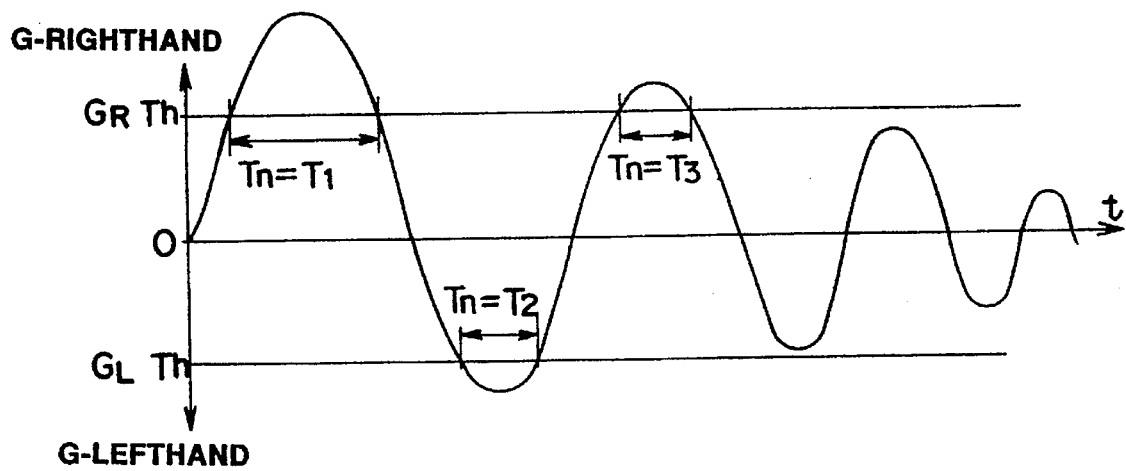
FIG. 12 is a diagram showing changes in the operated values in case the ignition inhibiting control is executed for a total time period longer than a threshold value.

Incidentally, in case the detected signal is processed, as shown in FIG. 11, the ignition of the side air bag at the non-collision side is inhibited depending upon how many times the predetermined (threshold) value is exceeded by the acceleration detected at the time of a collision. Alternatively, the ignition and inhibition of the air bag can be controlled, as shown in FIG. 12, by determining the time period Tn, for which the acceleration detected at the time of the collision exceeds the predetermined value (i.e., the threshold values: $G_R$th and $G_L$th) and by depending upon whether the integrated value Σ Tn is positive or negative.

Figure 13:
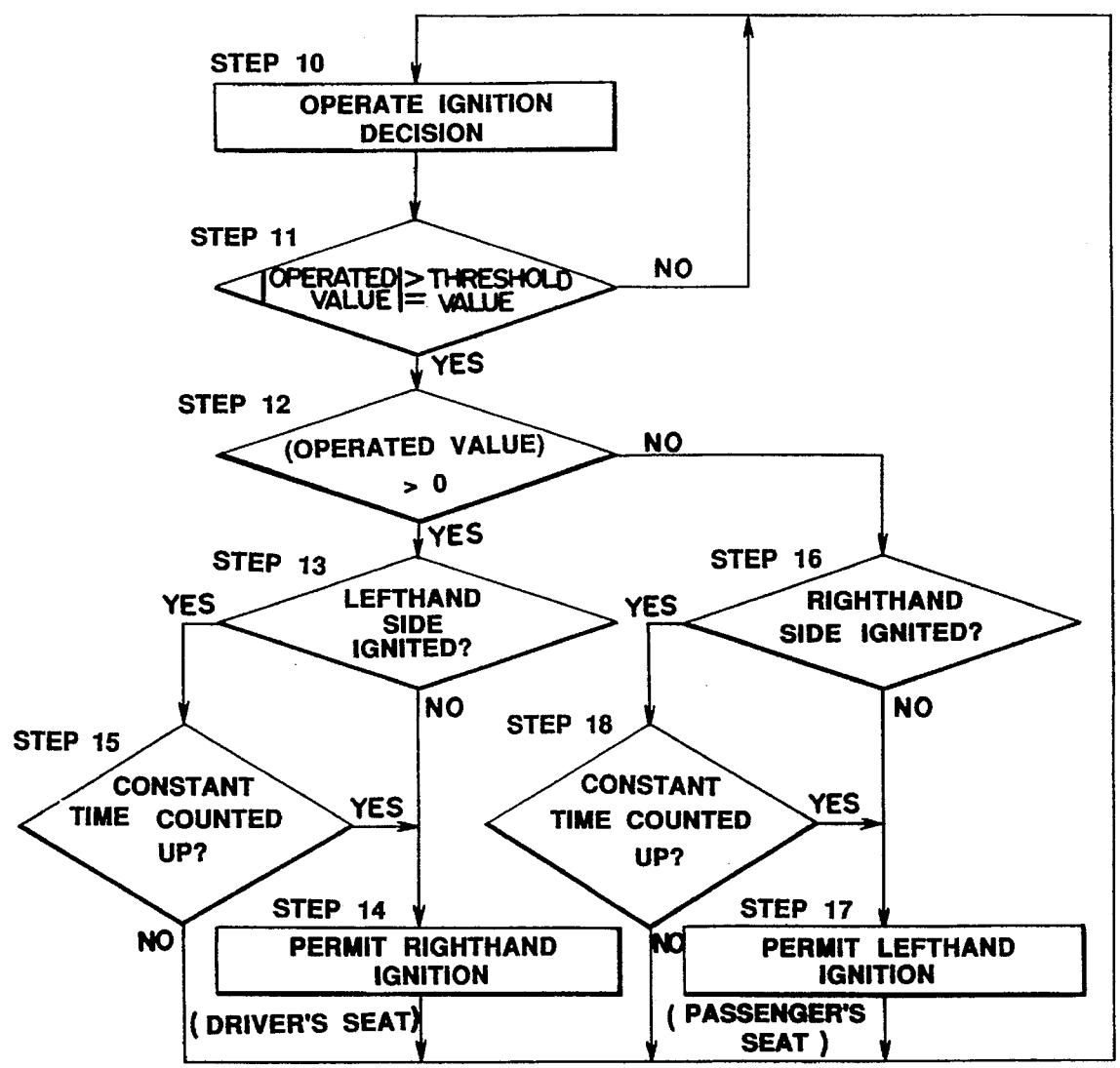
FIG. 13 is a flow chart showing another example of an inhibition control routine of an air bag module.

On the other hand, FIG. 13 is another flow chart of the air bag activation control program to be executed at the time of a lateral collision of the vehicle. In the shown example, the ignition of the air bag is controlled by using a timer.

Specifically, at the time of a lateral collision of the vehicle, the detected signal of the semiconductor type acceleration sensor is converted into a digital signal by the A/D converter and is inputted to the air bag control unit for lateral collisions. Incidentally, the signal has a positive polarity in case of a collision at the righthand side of the vehicular body and a negative polarity in case of a collision at the lefthand side. When an acceleration signal is inputted, an operation similar to the integration of the first embodiment is executed at Step 10. At Step 11, it is decided whether or not the absolute value of the operated value of Step 10 exceeds a predetermined threshold value. If the absolute value of the operated value is smaller than the threshold value, the routine returns to Step 10. If the absolute value of the operated value is not smaller than the threshold value, on the other hand, the routine advances to Step 12.

At Step 12, it is decided whether or not the operated value is positive. If the answer is YES, it is decided that the collision is at the righthand side of the vehicular body, and the routine advances to Step 13, at which it is checked whether or not the lefthand air bag is ignited. If the answer is NO, the collision is not the resulting vibratory return, and the routine advances to Step 14, at which the ignition of the righthand air bag is permitted.

Moreover, if the check of Step 13 decides that the lefthand air bag has been ignited, the collision is the resulting vibratory return, and the routine advances to Step 15. At Step 15, moreover, the completion of counting a predetermined time period, i.e., the time-up is decided. If this time-up is not ended, the routine returns to Step 10, at which the ignition of the righthand air bag is inhibited. After the predetermined time period has elapsed, the routine advances to Step 14, the ignition of the righthand air bag is permitted.

On the other hand, if the operated value is negative at Step 12, it is decided that the collision is at the lefthand side of the vehicular body, and the routine advances to Step 16, at which it is checked whether or not the righthand air bag has been ignited. If the answer is NO, the collision is not the resulting vibratory return, and the routine advances to Step 17, at which the ignition of the lefthand air bag is permitted.

On the other hand, if the check of Step 16 reveals that the righthand air bag has been ignited, the collision is the resulting vibratory return, and the routine advances to Step 18. At Step 18, the counting of a predetermined time period is started. Before the predetermined time period has not elapsed, the routine returns to Step 10, and the ignition of the righthand air bag is inhibited. After the predetermined time period has elapsed, the routine advances to Step 17, at which the ignition of the lefthand air bag is permitted.

As a result, the air bag in the collisional direction of the righthand and lefthand ones never fails to be ignited earlier so that the ignition of the air bag at the non-collision side can be inhibited at the vibratory return of the collision for the predetermined time period by the timer thereby to prevent any unnecessary air bag from being expanded. Moreover, if a lateral collision should happen at the opposite side after the lateral collision of one side, the corresponding air bag can be effectively expanded.

Figure 14:
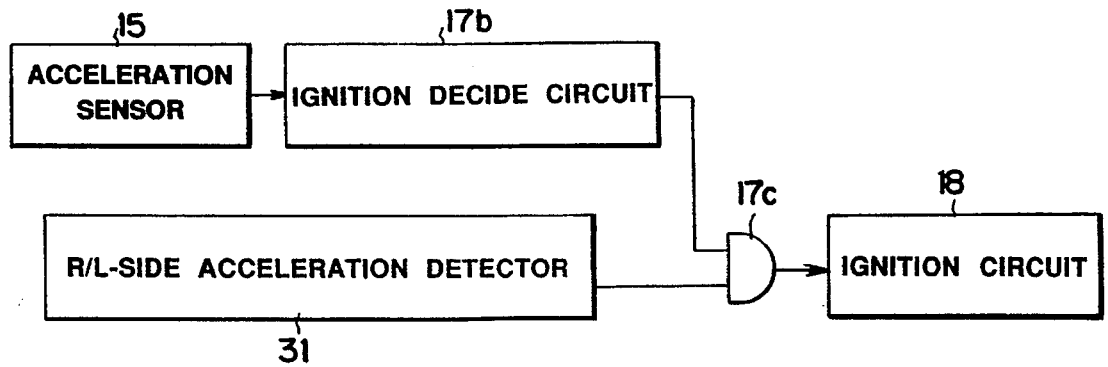
FIG. 14 is a block diagram showing still another embodiment of the control system according to the present invention.
Figure 15:
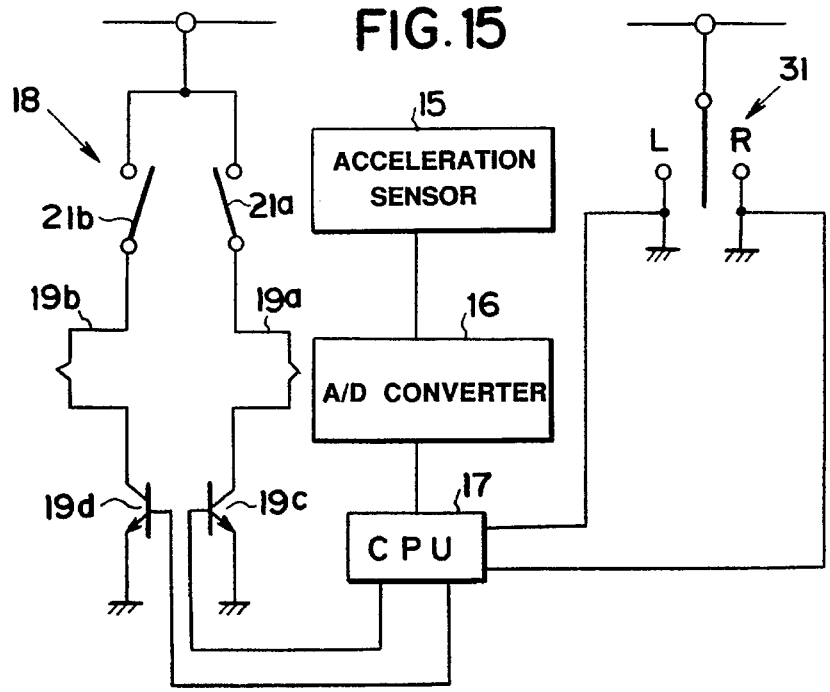
FIG. 15 is a circuit diagram specifically showing one example of the ignition circuit in the control system shown in FIG. 14.
Figure 16:
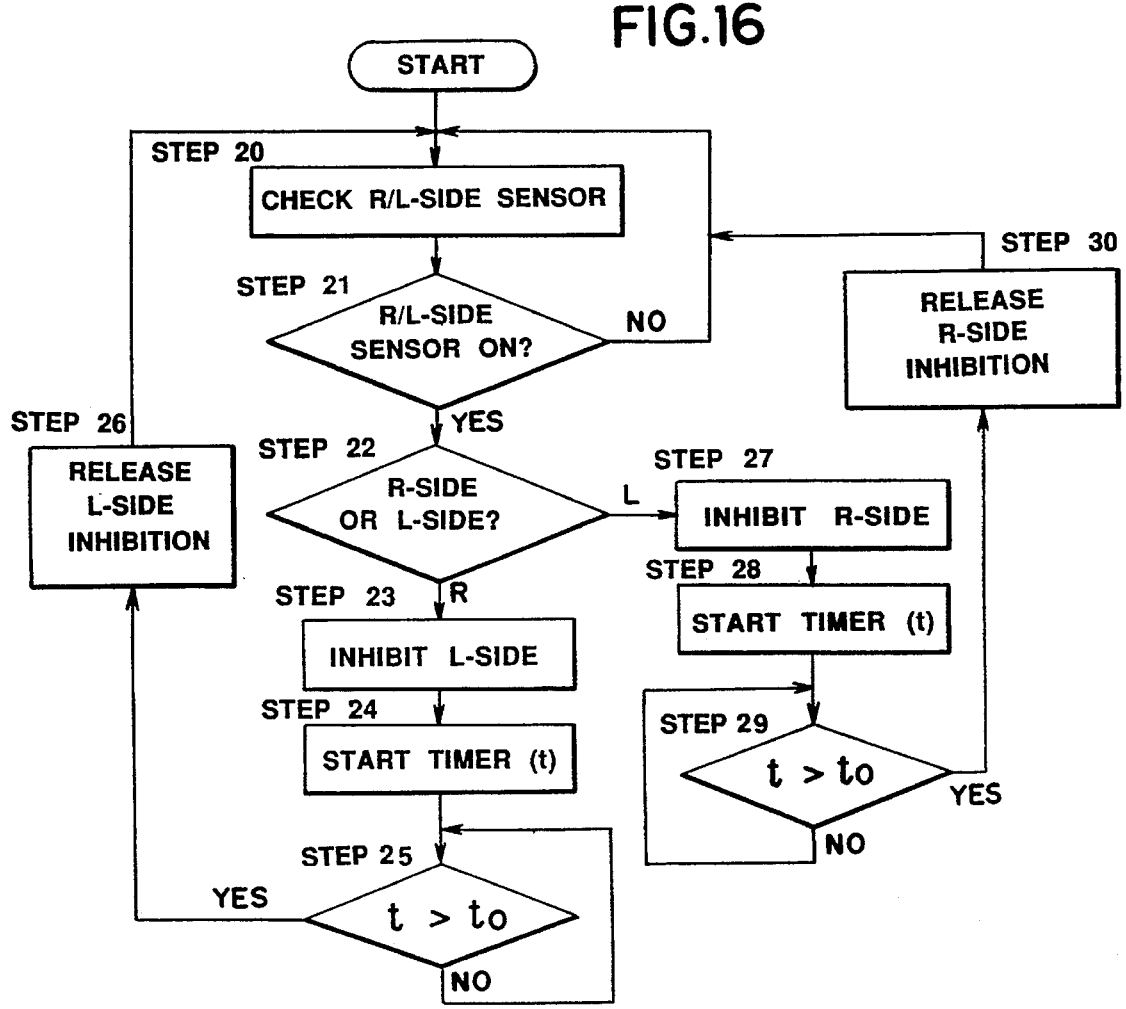

FIGS. 14 to 16 show another embodiment of the present invention. This control system is exemplified by controlling the inhibition of activation of a non-collisional side air bag of the righthand and lefthand ones with the signal of a sensor for detecting the input direction of a collisional load mechanically. Incidentally, the components common with those of the foregoing embodiments are designated at identical reference numerals, and their detailed description will be omitted in the following.

FIG. 14 is a block diagram showing a construction of the control system of this embodiment. This control system includes: the ignition decide circuit 17b for a lateral collision air bag control unit, which operates an ignition decision on the basis of the signal coming from the lateral collision acceleration sensor 15 such as the semiconductor type acceleration sensor; and a righthand/lefthand acceleration input direction detector 31 for detecting the input direction of the collisional load. The operated value of the ignition decide circuit 17b and the detected signal of the righthand/lefthand acceleration input direction detector 31 are inputted to the AND gate 17c. In response to an output signal of this AND gate 17c, a signal current is fed to the ignition circuit 18 to ignite the (not-shown) inflator. Then, this inflator produces gases to inflate the lateral collision air bag in the collisional direction thereby to expand it in a predetermined direction within the compartment.

On the other hand, FIG. 15 is a circuit diagram showing the control system of this embodiment equipped with The righthand/lefthand acceleration input direction detector 31. The lateral collision acceleration sensor 15 is connected with the lateral collision air bag control unit 17 through the A/D converter 16, and the righthand/lefthand acceleration input direction detector 31 is connected with the lateral collision air bag control unit 17. Moreover, the righthand/lefthand ignition circuit 18 is composed of the squibs 19a and 19b, the safety sensors 21a and 21b and the transistors 19c and 19d, which are connected in two series and of which the transistors 19c and 19d are turned ON/OFF in response to the output signal of the lateral collision air bag control unit 17.

Here will be described the control of inhibiting the activations of the air bags by the lateral collision air bag control unit 17 with reference to the flow chart of FIG. 16.

First of all, at Step 20, the signal of the righthand/lefthand acceleration detector 31 is checked. At Step 21, it is decided whether or not the righthand/lefthand acceleration detector 31 is turned ON. If the answer is NO, the routine is returned to Step 20. If the answer is YES, the routine advances to Step 22, at which it is checked which of the rightward or leftward acceleration the righthand/lefthand acceleration detector 31 has detected. If the rightward acceleration is detected, the routine advances to Step 23, at which the ignition of the righthand air bag is permitted whereas the activation of the opposite lefthand air bag is inhibited. The routine then advances to Step 24, at which the timer is started. The inhibited state is held at Step 25 till a predetermined time period to elapses. If this predetermined time period elapses ($t>t_o$) at Step 25, the routine advances to Step 26, at which the inhibition of activation of the lefthand air bag is released. The routine is then returned to Step 20.

On the other hand, if the lefthand acceleration is detected at Step 22, the routine advances to Step 27, at which the ignition of the lefthand air bag is permitted whereas the activation of the opposite righthand air bag is inhibited. The routine then advances to Step 28, at which the timer is started, and the inhibited state is held at Step 29 till the predetermined time period to elapses. If the predetermined time period elapses ($t>t_o$) at Step 29, the routine advances to Step 30, at which the inhibition of activation of the righthand air bag is released, and the routine is returned to Step 20.

Figure 17:
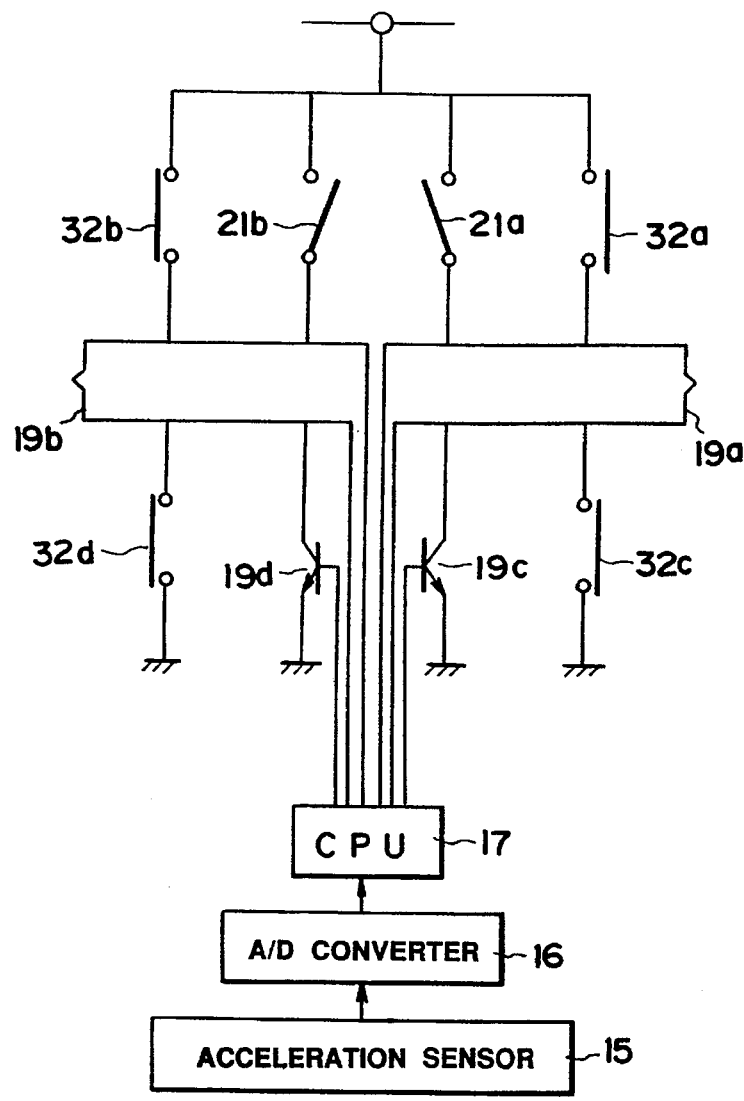
FIG. 17 is a circuit diagram showing still another example of the ignition circuit.

On the other hand, FIG. 17 shows a third embodiment of the present invention. This control system controls the inhibition of activation of the non-collision side air bag of the righthand and lefthand ones with the signals of the safety sensor and the touch-type collision sensor for detecting the input direction of a collisional load mechanically. Incidentally, the components common with those of the foregoing embodiment shown in FIG. 14 are designated at the identical reference numerals, and their detailed description will be omitted in the following.

With the lateral collision air bag control unit 17, as shown in FIG. 17, there are connected at one side the acceleration sensor 15 through the A/D converter 16 and at the other the squibs 19a and 19b for igniting the inflators. These squibs 19a and 19b are connected with the safety sensors 21a and 21b and touch-switch type collision sensors 32a and 32b in parallel.

In the control system shown in FIG. 17, like the embodiment of FIG. 14, when the acceleration sensor 15 detects a collision, for example, the righthand safety sensor 21a especially for detecting the righthand collision is turned ON at first by the acceleration in the rightward direction of the vehicular body so that its ON signal is inputted to the lateral collision air bag control unit 17. As a result, the activation of the righthand air bag is permitted at first, but the activation of the lefthand air bag at the non-collision side is inhibited.

Likewise, when the lefthand safety sensor 21b especially for detecting the lefthand collision is turned ON at first by the acceleration in the leftward direction of the vehicular body so that its ON signal is inputted to the lateral collision air bag control unit 17. Then, the activation of the lefthand air bag is permitted, but the activation of the righthand air bag at the non-collision side is inhibited. Thus, like the embodiment shown in FIG. 14, the air bag at the non-collision side can be prevented from being expanded. Incidentally, reference numerals 32c and 32d appearing in FIG. 17 designate touch-switch type collision sensors which are similar to the aforementioned collision sensors 32a and 32b.

Figure 18:
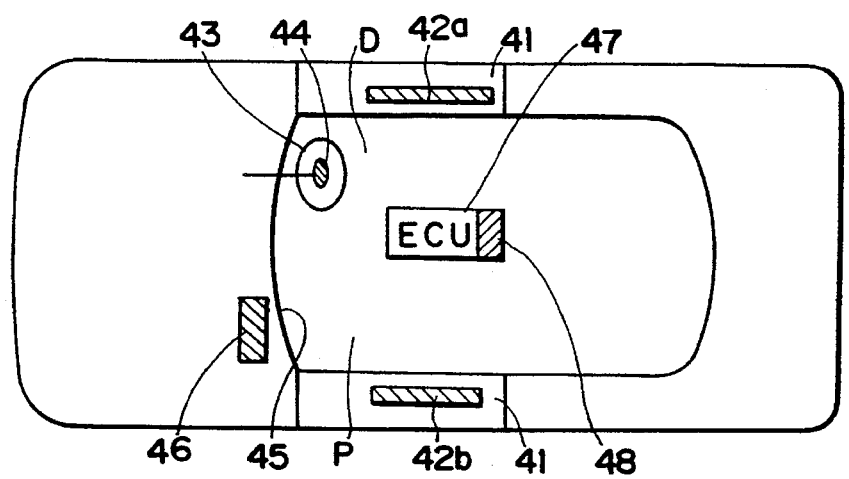
FIG. 18 is a diagram showing the arrangement of air bag modules for frontal and lateral collisions and the control system.

Here will be described an embodiment for controlling the frontal collision air bag system and the lateral collision air bag systems. As shown in FIG. 18, the vehicle, to which is applied this embodiment, is equipped with side air bag modules 42a and 42b individually confining air bags and inflators in folded shapes. These side air bag modules 42a and 42b are supported by the (not-shown) door inner panels within the compartment sides of side doors 41 which are located at the individual sides of the driver's seat D and the passenger's seat P of the vehicle.

In front of the driver's seat D, on the other hand, there is disposed a D's seat air bag module 44 for a frontal collision, which is fitted together the inflator in the central portion of a steering wheel 43. In an instrumental panel 45 in front of the passenger's seat P, moreover, there is disposed a P's seat air bag module 46 for a frontal collision, which likewise confines the air bag and the inflator therein. The vehicle is further equipped in the vicinity of the center console of the compartment with an air bag activation control unit 47 for controlling the individual activations of the air bags for the lateral and frontal collisions, and an acceleration sensor 48 for detecting a collision. This acceleration sensor 48 can be exemplified by the semiconductor type acceleration sensor 15 shown in FIG. 3.

The acceleration (or deceleration) to be applied at the time of a collision becomes different depending upon the relative angle or velocity between the vehicle and the obstacle. Thus, in case the vehicle is equipped with the frontal collision air bag systems and the lateral collision air bag systems, as described above, it is required to determine the air bag system to be activated in accordance with the mode of collision.

Figure 19:
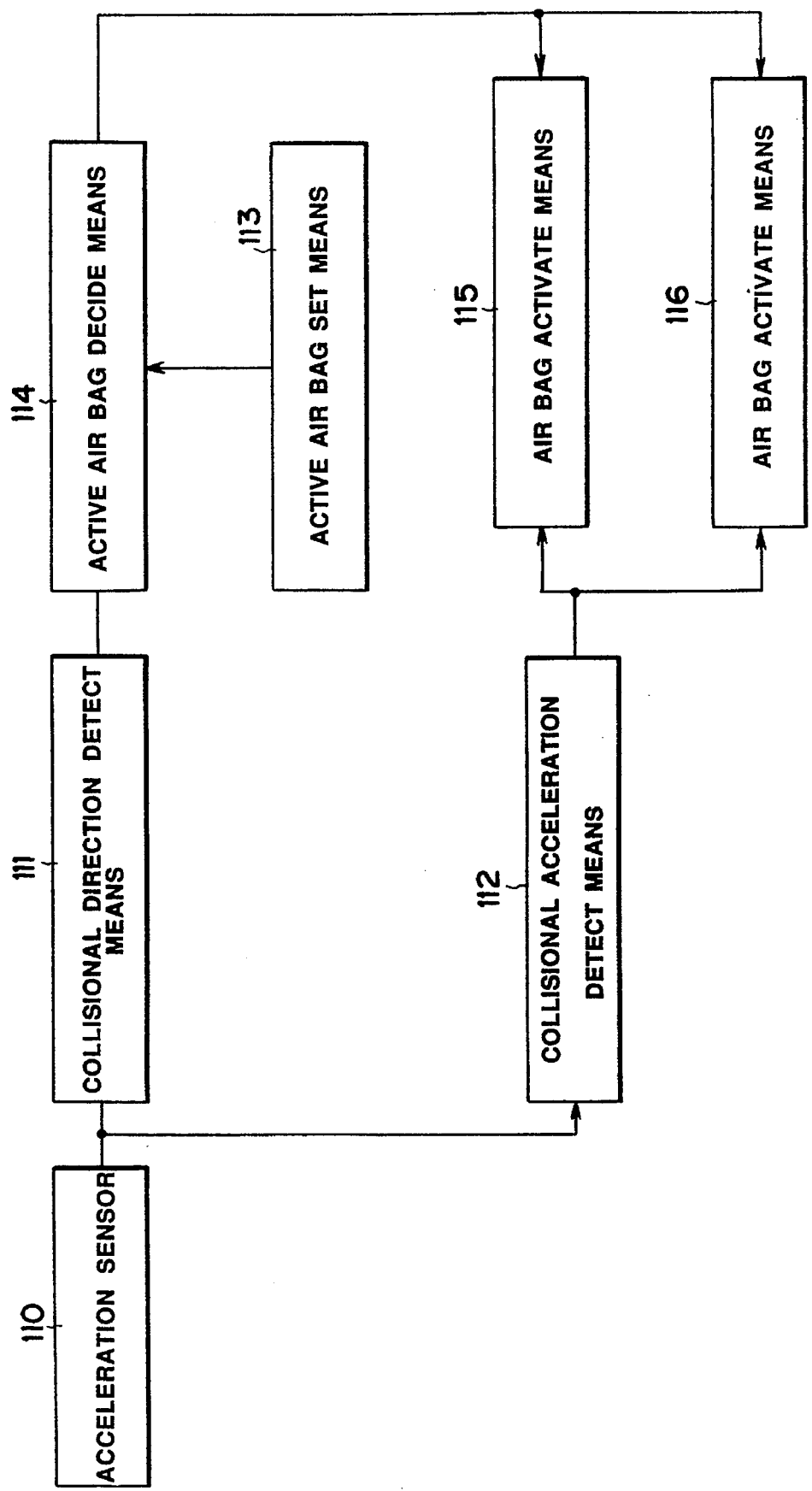
FIG. 19 is a block diagram showing a control system for determining an air bag module to be activated, by functional means.

The activation control system is illustrated with functional means in FIG. 19. Specifically, the activation control system is equipped with an acceleration sensor 110 for detecting the accelerations of the vehicle in two directions, i.e., the lengthwise direction and the lateral direction. On the basis of the output signal of the acceleration sensor 110, collisional direction detect means 111 detects the direction of a collision. This detection is executed by composing the vector of the longitudinal acceleration of the vehicle, which is obtained from the output signal of the acceleration sensor 110, for example, and the vector of the lateral acceleration. On the other hand, the acceleration, i.e., magnitude of the acceleration is detected by collisional acceleration detect means 112 on the basis of the output signal of the acceleration sensor 110. This detection can be executed by composing the aforementioned vectors of the longitudinal and lateral accelerations, for example.

The air bag system to be activated may be diversified according to the mode of a collision into various combinations such as only the frontal collision air bag system or additionally the righthand or lefthand air bag systems. In the control system shown in FIG. 19, therefore, the patterns of combination of the air bag systems to be activated are preset by active air bag set means 113. Thus, when the aforementioned collisional direction detect means 111 detects the direction of a collision, active air bag decide means 114 determines a specific air bag system to be activated, on the basis of the combinatorial pattern of the air bag system according to that direction. If the acceleration detected by the aforementioned collisional acceleration detect means 112 is so high as to inflate the air bag, air bag activate means 115 or 116 activates the air bag system determined by the active air bag decide means 114, to expand the corresponding air bag.

Figure 20:
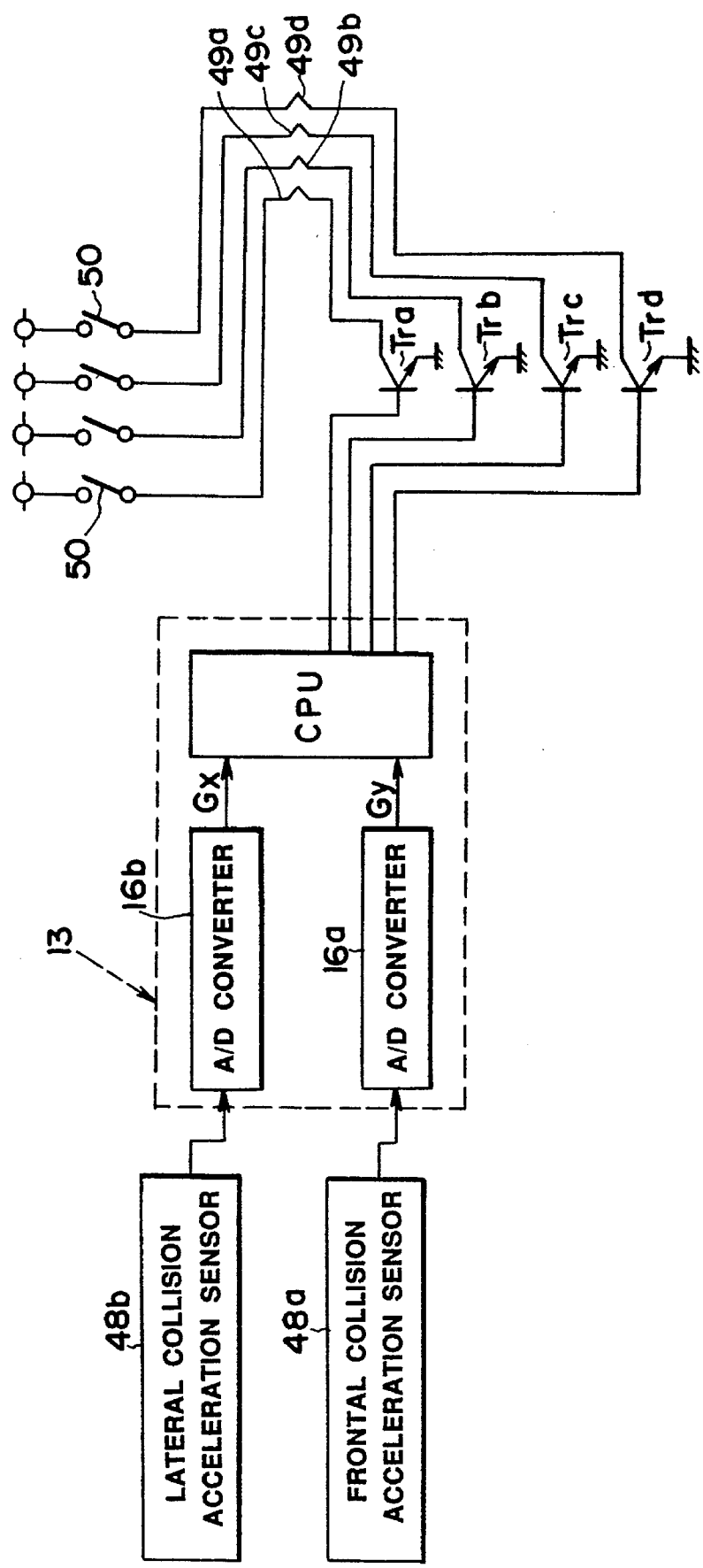
FIG. 20 is a circuit diagram showing an ignition circuit of the control system.

The control system for activating the frontal collision air bag system and the lateral collision air bag system selectively will be described more specifically. In FIG. 20, a frontal collision acceleration sensor 48b is connected with the CPU through an A/D converter 16b, and a lateral acceleration sensor 48a is connected with the CPU through an A/D converter 16a. The control unit 13 including this CPU operates the direction and magnitude of the acceleration and outputs a signal for turning ON any of transistors Tra to Trd composing a switching circuit, on the basis of the operated result. These transistors Tra to Trd are individually connected in series with squibs 49a to 49d and safety sensors 50 of the aforementioned air bag systems 42a, 42b, 44 and 46. These safety sensors 50 can be exemplified by the aforementioned mercury or roller type ones.

Figure 21:
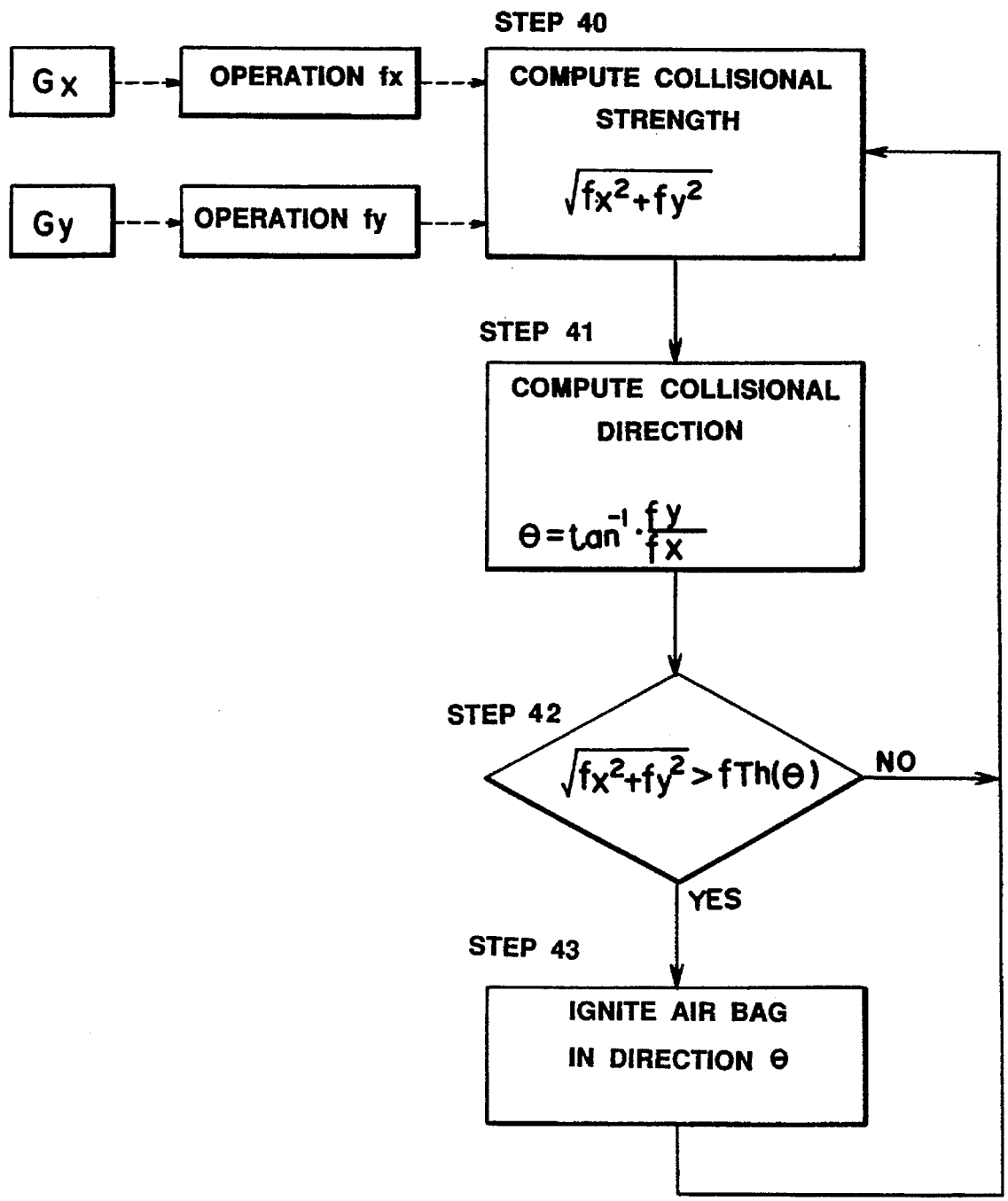
FIG. 21 is a flow chart showing a routine for detecting a collisional direction and the strength of a collision.
Figure 23:
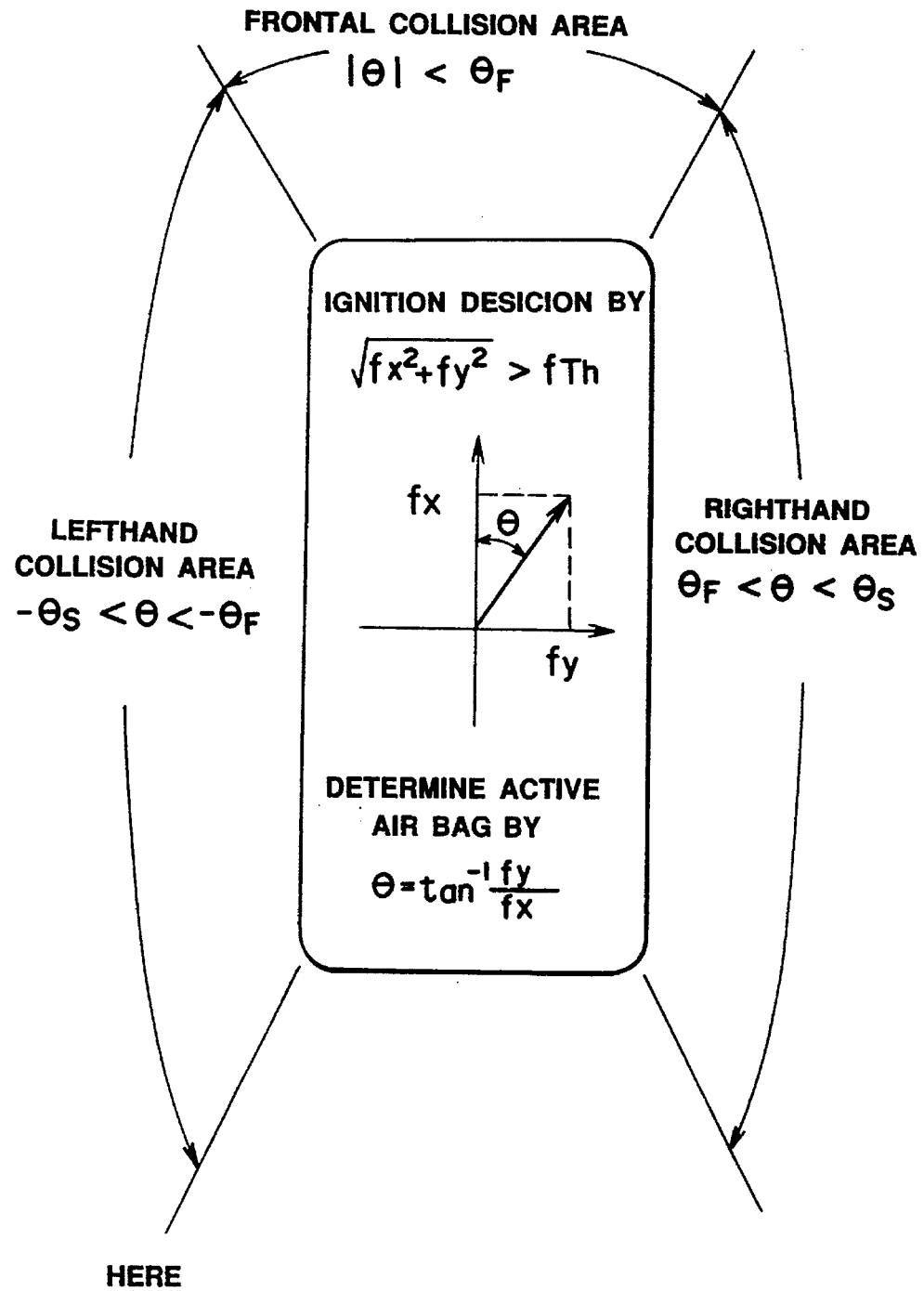
FIG. 23 is an explanatory diagram showing the relations between the operated values and the collisional directions.

In the control unit 13 shown in FIG. 20, the signals outputted by the frontal collision acceleration sensor 48b and the lateral collision acceleration sensor 48a are subjected to A/D conversions, and the converted data are processed or integrated into data fx and fy, upon which the vector operations are executed to determine the strength and direction of the collision. These processing procedures of the data are illustrated in FIG. 21. Specifically, the collisional strength is determined by finding the root of $(fx^2+fy^2)$ and by deciding whether or not the root is larger than a predetermined threshold value $f_{Th}$. On the other hand, the collisional direction is determined by finding $(\tan^{-1} fy/fx)$ so that the air bag to be expanded is determined from the (angular) value of the determined collisional direction.

If the result reveals that the root of $(fx^2+fy^2)$ exceeds the threshold value, the inflator of the air bag module in the position corresponding to the collisional direction is ignited to inflate and expand the air bag with the gases produced.

On the other hand, the numerical values to be used for the operations in the control unit 17 can be exemplified, as enumerated in FIG. 22, by the individual detected values Gx and Gy of the two acceleration sensors 48a and 48b as they are, the integrated values Vx and Vy of first order of the detected values Gx and Gy, or the integrated values Sx and Sy of second order of the detected values Gx and Gy. Incidentally, the integrated values Vx and Vy of first order correspond to the velocities of the collision, and the integrated values Sx and Sy of second order correspond to the moving distances of the passenger.

Here will be described more specifically the operations of the system shown in FIGS. 18 to 20. First of all, in case the vehicle has its side door portion hit by another vehicle, the frontal and lateral collision acceleration sensors 48a and 48b of the acceleration sensor 48 mounted on the central portion of the vehicular body detect the longitudinal and lateral accelerations of the vehicular body, respectively. The accelerations Gx and Gy thus detected are subjected to the A/D conversions and are then processed to the operated values fx and fy to be used for the operations, as enumerated in FIG. 22. Then, the collisional strength, i.e., the square root of $(fx^2+fy^2)$ is computed at Step 40. At Step 41, the collisional direction $\Theta$, i.e., $(\tan^{-1} fy/fx)$ is computed. At Step 42, moreover, the computed root of the $(fx^2+fy^2)$ and the threshold value $f_{Th}$ are compared. If the comparison reveals that the root is no more than the threshold value, the routine is returned to Step 40 so that the air bag is left unexpanded. On the other hand, if the root of $(fx^2+fy^2)$ is more than the threshold value at Step 42, the routine advances to Step 43.

At Step 43, the air bag to be expanded is determined on the basis of the collisional direction θ computed at Step 41. If the absolute value of the determined value θ is less than the frontal collision threshold value, that is, if |θ|<θF, the collision is decided at the frontal side. And, the inflators of the driver's seat air bag module 44 for the frontal collision arranged at the center of the steering wheel 43 and the passenger's seat air bag module 46 for the frontal collision arranged in front of the instrument panel 45 of the passenger's seat P are ignited to inflate/expand the corresponding air bags with the produced gases thereby to protect the passengers from any possible secondary collision against the steering wheel 43 and the instrument panel 45.

If the determined value θ falls within the ranges of −θS<θF, the collision is decided at the lefthand side of the vehicular body, and the inflator of the side air bag module 42b confined in the lefthand side door is ignited to inflate/expand the air bag with the produced gases thereby to protect the passenger from any secondary collision against the inner wall or the side shield of the lefthand side door.

If the determined value θ falls within the ranges of θF<θ<θS, the collision is decided at the righthand side of the vehicular body, and the inflator of the side air bag module 42a confined in the righthand side door is ignited to inflate/expand the air bag with the produced gases thereby to protect the passenger from any secondary collision against the inner wall or the side shield of the righthand side door.

As a result, when both the sensor for the frontal collision and the sensor for the lateral collision detect a collision of the vehicle, if any, the vectors of the acceleration in the two forward and lateral directions are operated, and these vector values are used to decide the ignition of the air bag, the direction of the ignition and the air bag itself to be ignited. Thus, the proper air bag can be inflated and expanded without any such a malfunction as will expand any unnecessary air bag.

Since, in case of a lateral collision, what acts as a member for absorbing the collisional load is the components of the side portion of the vehicular body, i.e., the side door, the extent of absorbing the shocks by the vehicle body is so low that severer influences are liable to affect the passenger more than the frontal collision in which the various parts in the engine room and the various chassis components are compressed to absorb the shocks. Therefore, the reference value for deciding the lateral collision, i.e., the threshold value for the lateral collision is set to a lower value than that of the threshold value for the frontal collision.

Figure 24:
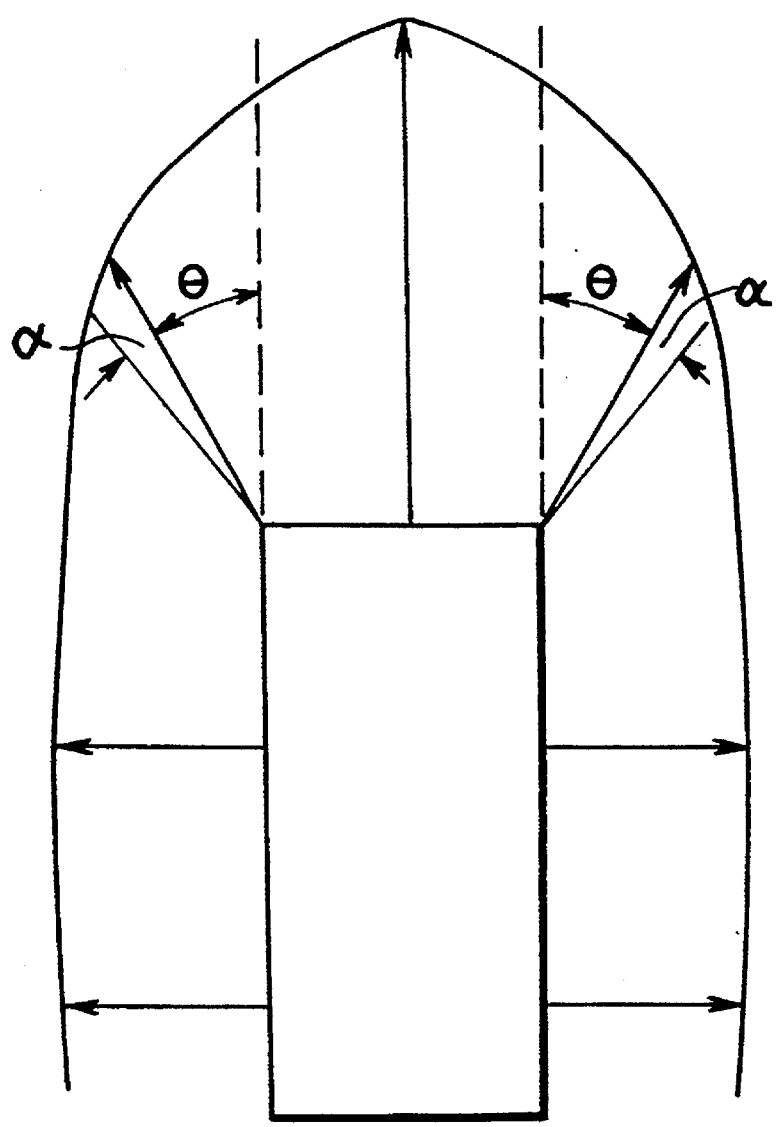
FIG. 24 is an explanatory diagram showing the magnitudes of threshold value set differently for locations of a vehicle body.

In case a collision occurs within a sector-shaped frontal collision area which is opened by an angle θ (θ=about 30 degrees) from the front of the vehicular body, as shown in FIG. 24, the reference for deciding the collision is set to a large value because shocks have to be absorbed to a great extent. On the other hand, in case a collision occurs within a lateral collision area which is opened by an angle of (90−θ) degrees obliquely to the front from the side face of the vehicular body, less shocks are absorbed by the side door or the like. In order to protect the passenger without fall, therefore, the reference for deciding the collision is set to a smaller value than that of the frontal collision so that even a lower collisional load may be decided as coming from the collision to ensure safety of the passenger.

Moreover, the boundary between the aforementioned frontal collision area and lateral collision area is overlapped within the range of a predetermined angle α (e.g., about 5 to 10 degrees). If a collision occurs at the range of the angle α, both the frontal collision air bag and the lateral collision air bag are expanded to protect the passenger.

Incidentally, it is necessary to inhibit activation of any unnecessary air bag module, too, in case the vehicle is equipped with the frontal collision air bag module 44 and the righthand and lefthand air bag modules 42a and 42a, as described above. Here will be described an example of the system for executing the so-called "inhibition control".

Figure 25:
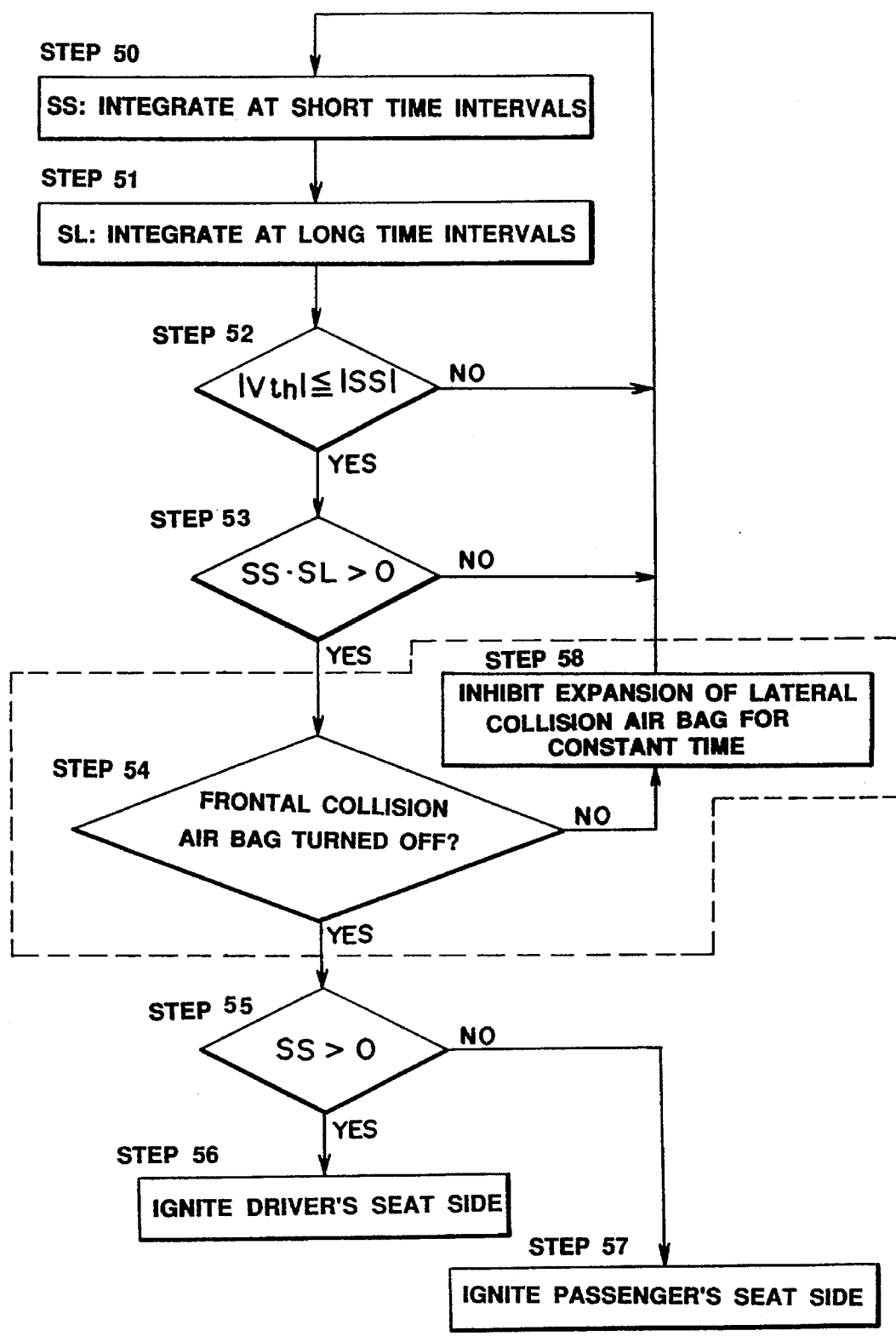
FIG. 25 is a flow chart showing a routine for the inhibition controls of the air bag systems for frontal and righthand/lefthand collisions.

As described above, the lateral collision air bag modules 42a and 42b and the frontal collision air bag module 44 are activated when the transistors composing the switching circuit are turned ON on the basis of the data which are produced by A/D conversions of the detected signals of the acceleration sensors 48a and 48b corresponding thereto. In this case, the control unit of the air bag module activated beforehand sends its signal to the other control unit to inhibit the activation of the other air bag module. FIG. 25 is a flow chart showing a control routine therefor. First of all, at Step 50, input data are integrated at short time intervals to determine their integrated value SS. At Step 51, integrations at long time intervals are likewise executed to determine the integrated value SL. At Step 52, it is decided whether or not the absolute value of the integrated value SS determined by the integrations at the short time intervals is larger than the absolute value of a predetermined threshold value Vth. If the answer is NO, the routine is returned to Step 50.

On the other hand, if the answer of Step 52 is that the absolute value of the integrated value SS is larger than the absolute value of the threshold value Vth, the routine advances to Step 53, at which it is examined whether or not the product of the integrated value SS obtained by the integrations at the short time intervals and the integrated value SL obtained by the integrations at the long time intervals is positive, that is, whether both the integrated value SS and the integrated value SL are positive or negative. If these two integrated values SS and SL are differently positive and negative, the routine is returned to Step 50.

If the examination of Step 53 reveals that SS·SL>0, the routine advances to Step 54. At Step 54, it is checked on the basis of the information from the frontal collision air bag control unit whether or not the frontal collision air bags 44 and 46 are previously turned OFF. If the frontal collision air bags 44 and 46 are not ignited either, the routine advances to Step 55.

At Step 55, it is examined whether or not the integrated value SS obtained by the integrations of short time intervals is positive. If the answer is YES, the routine advances to Step 56, at which the squib of the inflator of the side air bag module 42a at the driver's (righthand) side is ignited. If the answer of Step 55 is that the integrated value SS is negative, the routine advances to Step 57, at which the squib of the inflator of the side air bag module 42b at the passenger's (lefthand) side is ignited.

On the other hand, if the check of Step 54 answers that the frontal collision air bag modules 44 and/or 45 are ignited, the routine advances to Step 58, at which the expansion of the lateral collision air bags is inhibited for a predetermined time period. After lapse of this predetermined time period, the inhibition of expansion of the lateral collision air bags is released, and the routine is returned to Step 50.

For decisions of the ignition of the frontal collision air bags, the information from the lateral collision control unit is inputted to check whether or not the lateral collision air bags have been expanded beforehand. If the answer is NO, the collision is decided to have occurred at the front, and the frontal collision air bag modules 44 and 46 are ignited. On the other hand, if the lateral collision air bags are expanded beforehand, it is decided that the collisional load at the lateral side has been erroneously detected, and the ignition of the frontal collision air bags is controlled and inhibited for the predetermined time period.

One specific example of the circuit for this inhibition control is shown in FIG. 26. The system, as shown, controls the ignition of the air bags by using mechanical acceleration sensors 51 and 52 in place of the semiconductor type acceleration sensors which are used as the collision sensors in the foregoing individual embodiments. The ignition control circuit (as located at the righthand half of FIG. 26) for the frontal collision and the ignition control circuit (as located at the lefthand half of FIG. 6) for the lateral collision are connected with each other through an inhibition circuit (composed of transistors Tr1 and Tr2) for inhibiting the mutual air bag activations. The inhibition control circuit is further equipped with a circuit 53 for detecting ON/OFF of the frontal collision acceleration sensor and a circuit 54 for detecting the ON/OFF of the lateral collision acceleration sensor. If one of these acceleration sensor ON/OFF detect circuits 53 and 54 detects the ON state of the acceleration sensor 51 or 52, the inhibition circuit of the partner is activated to prevent the expansion of the unnecessary air bag. Incidentally, the inhibition of this air bag activation is held for a predetermined time period by timer circuits 55 and is then released. Incidentally, reference numerals 56 and 57 appearing in FIG. 26 designate squibs of the inflators for inflating the individual air bags. Specifically, while either of the timer circuits 55 is active, the transistor Tr2 is turned OFF so that the other transistor Tr1 is also turned OFF. As a result, neither the squib 56 nor 57 is energized even if the acceleration sensor 52 is turned ON.

Here will be described the operations of the system thus constructed. Since diagnosis resistors 51a and 52a are connected in parallel with the acceleration sensors 51 and 52, respectively, a high-level signal is inputted to the individual plus (+) sides of the acceleration sensor ON/OFF detect circuits 53 and 54 if the acceleration sensors 51 and 52 are OFF. Accordingly, the high-level signal is outputted from each of the acceleration sensor ON/OFF detect circuits 53 and 54.

If the frontal collision acceleration sensor 51 is turned ON beforehand, for example, a low-level signal is inputted to the plus (+) side of the frontal collision acceleration sensor ON/OFF detect circuit 53 so that the ON state is detected. Accordingly, the low-level signal is outputted from the frontal collision acceleration sensor ON/OFF detect circuit 53 and is inputted to the inhibit circuit for the lateral collision.

Specifically, the transistor Tr2 is turned OFF in response to the low-level signal coming from the frontal collision acceleration sensor ON/OF detect circuit 53, so that the other transistor Tr2 connected therewith is also turned OFF to open the circuit for the squib 56 thereby to inhibit the expansion of the lateral collision air bags.

Moreover, the expansion inhibited state of the lateral collision air bags is held for a predetermined time period by the timer circuit 55. After lapse of this predetermined time period, the high-level signal is then outputted from the timer circuit 55 to release the inhibition of the lateral inhibit circuit composed of the transistors Tr1 and Tr2 thereby to permit the lateral collision air bags to be expanded.

On the other hand, if the lateral collision acceleration sensor 52 is turned ON beforehand, the frontal collision inhibit circuit likewise operates to inhibit the expansion of the frontal collision air bags for a predetermined time period.

Thus, according to the control system of this embodiment, if either of the frontal collision air bags and the lateral collision air bags is expanded beforehand, the expansion of the other air bags is inhibited for the predetermined time period so that any unnecessary air bag can be prevented frown being expanded. Since the malfunction of the air bags at the non-collision side is thus prevented, the left air bags can be expanded for effective use when another collision occurs at a location of the left air bags.

Incidentally, the foregoing individual embodiments have been described by taking up their representative examples. Hence, the control system of the present invention should not be limited to those embodiments but can be applied to another case, in which it is combined with a rear collision air bag system for protecting a passenger from a collision at the back of a vehicular body (e.g., a rear-end collision or a collision at the time of a backward run).

As has been described hereinbefore, the activation control system for a vehicular air bag according to the present invention can expand the air bag in a necessary position according to a collisional direction while inhibiting activation of the remaining air bag or bags, so that it can protect the passenger without fail while preventing the expansion of the unnecessary air bag or bags. Moreover, if the inhibition of the activation of the air bags is released after lapse of a predetermined time period, the air bags left unexpanded can be expanded at the time of a secondary collision.

In the vehicular air bag activation control system of the present invention, moreover, the accelerations in the two directions, i.e., in the longitudinal and lateral directions at the time of a collision of the vehicle are composed by the vector operations. On the basis of the vector values thus determined, the collisional direction and acceleration are detected, and the active air bags are set according to the collisional direction. As a result, the collisional direction can be detected highly precisely, and the air bag in the proper position can be expanded according to the collisional direction while preventing the unnecessary air bags from being expanded.

What is claimed is:

1. An activation control system for controlling activation of a plurality of air bag systems for protecting a passenger by expanding an air bag between the passenger and a vehicular body when the vehicle makes a collision, said activation control system comprising:

collision detect means for outputting a signal having its polarity changed alternately to plus and minus values according to the direction and magnitude of the collision;

collisional direction detect means for detecting the direction of the collision on the basis of both the integrated value of the numbers of times at which the signal of said collision detect means exceeds a predetermined plus threshold value, and the integrated value of the number of times at which the same signal exceeds a predetermined minus threshold value; and ignition signal output means for outputting an ignition signal to the air bag system which is determined on the basis of the collisional direction detected.

2. An activation control system according to claim 1, further comprising ignition inhibit means for inhibiting activation of the air bag systems other than that to which is outputted the ignition signal by said ignition signal output means.

3. An activation control system for controlling activation of a plurality of air bag systems for protecting a passenger by expanding an air bag between the passenger and a vehicular body when the vehicle makes a collision, said activation control system comprising:

collision detect means for outputting a signal having its polarity changed alternately to plus and minus values according to the direction and magnitude of the collision;

collisional direction detect means for detecting the direction of the collision on the basis of both the integrated value of the time periods at which the signal of said collision detect means exceeds a predetermined plus threshold value, and the integrated value of the time periods at which the same signal exceeds a predetermined minus threshold value; and ignition signal output means for outputting an ignition signal to the air bag system which is determined on the basis of the collisional direction detected.

4. An activation control system according to claim 3, further comprising ignition inhibit means for inhibiting activation of the air bag systems other than that to which is outputted the ignition signal by said ignition signal output means.

* * * * *